March 23, 1954     B. A. QUINN     2,673,072
WIRE FENCE
Filed July 9, 1951
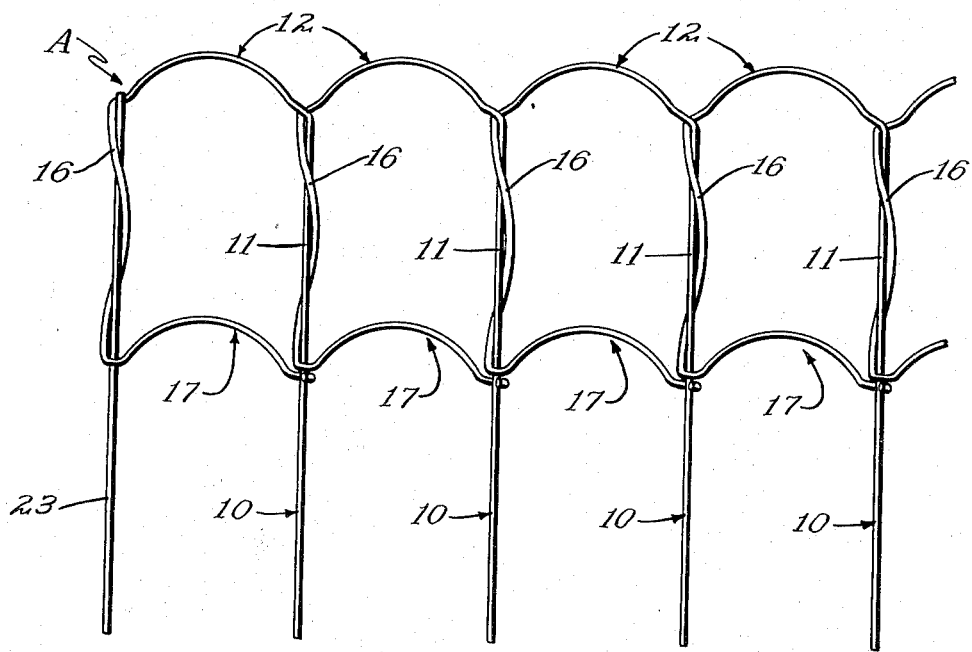
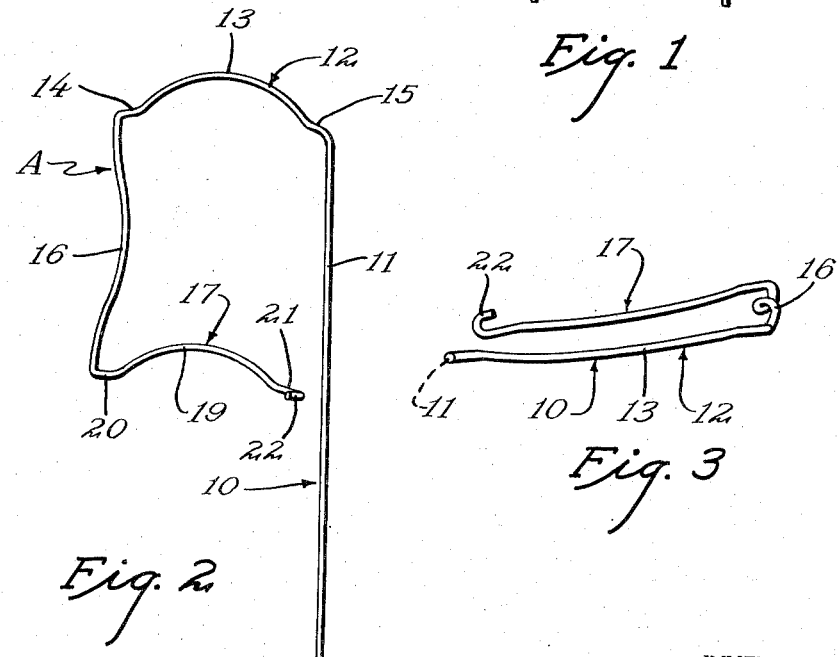
INVENTOR
Bert A. Quinn
BY Robert M. Dunning
ATTORNEY Patented Mar. 23, 1954

2,673,072

UNITED STATES PATENT OFFICE 2,673,072

WIRE FENCE

Bert A. Quinn, St. Paul, Minn.

Application July 9, 1951, Serial No. 235,866

2 Claims. (Cl. 256—33)

My invention relates to an improvement in fences and deals particularly with the type of fence often used for the protection of lawns, shrubbery, garden flowers, and the like.

Various types of decorative fences have been produced for guarding shrubbery, gardens, and the like. Most such fences are formed of wire fencing or the like which may be cut off at the proper length and supported in protecting position in any desired manner. Oftentimes, these fences include downwardly projecting portions which may engage directly into the ground to hold the fence in proper place.

An object of the present invention lies in the provision of a decorative fence made up of a series of similar sections which may be easily assembled together to form the fence of any desired length. A long fence may be easily formed by employing a considerable series of connected sections, while a shorter fence may be formed by merely employing a smaller number of sections. The fence may be assembled so that it is in circular form if desired and the fence sections are pivotally connected together so that the fence may be of any desired shape or contour.

A feature of the present invention lies in the provision of a fence comprised of a series of sections each including a substantially vertical post portion and a helically wound generally parallel portion designed to encircle the post of the next section. The post portion and the helical portion are connected at their upper ends by a cross member or arched member and the lower end of the helical portion is provided with a cross member or arched portion having a hook end designed to engage about the post portion. The helical portion may pivot relative to the post which it encircles so that the angularity between sections may be varied at will.

A feature of the present invention lies in the provision of a fence made up of a series of connected sections which are generally P-shaped in form. The sections are formed of wire or wire rod and are normally bent slightly out of common plane. One extremity of the wire rod forming each section is hook shaped to encircle the vertical post at the other end of the wire. The wire is normally bent so that when the hook is engaged with the post, the wire is under tension tending to hold the hook firmly engaged.

These and other objects and novel features of my invention will be more clearly and fully set forth in the following specification and claims.

It in the drawings forming a part of my specification:

Figure 1 is an elevation view of a series of fence sections connected together showing the appearance of the structure when assembled.

Figure 2 is a perspective view of one of the sections detached from the other sections.

Figure 3 is a top plan view of the section illustrated in Figure 2.

The fence A is made up of a series of similar sections indicated in general by the numeral 10. Each section includes a generally straight post 11 which may if desired be sharpened at its lower extremity. The post 11 is connected at its upper end to a cross connecting portion 12 extending in a generally horizontal direction. As best illustrated in Figure 1 of the drawings, the cross connecting portion 12 is upwardly arched at 13 and is reversely bent at 14 and 15. This shape is somewhat of a matter of choice and the cross connecting portion 12 could extend generally straight if desired. The arched construction illustrated is believed ordinarily more pleasing in appearance.

The arch 12 connects the post portion 11 to the generally helical portion 16. This helical portion is formed to provide approximately one elongated convolution which entirely encircles the post portion 11 of an adjacent section. This elongated helical portion is normally diverging from the post portion 11 when the sections are not assembled. It will be noted in Figure 2 of the drawings that the lower extremity of the helical portion 16 is spaced from the post 11 a distance greater than the distance between this post portion and the upper end of the helical portion 16. The sections are formed in this manner so as to provide spring tension holding the sections assembled, as will be later described in detail.

From Figure 3 of the drawings, it will be noted that the helical portion 16 is also arranged at a slight angle from the plane of the post portion 11 when the sections are not assembled. This arrangement provides a slight tension upon the post portion of the adjacent section when the sections are assembled and also provides tension tending to hold the sections assembled.

At the lower end of the helical portion 16 I provide a cross connecting portion 17. This cross connecting portion may be straight or substantially straight if desired. However, preferably this portion 17 includes an upwardly arched central portion 19 and substantially horizontally extending ends 20 and 21 thereon. The end 21 terminates in a reversely bent hook 22 designed to encircle the post portion 11.

In assembling the fence sections it is only necessary to insert the post portion 11 of one section 10 through the helical portion 16 of the next adjacent section and sliding the post through this helical portion until the helical portion of one section reaches the upper extremity of the post portion of the next section, as shown in Figure 1. The cross connecting member 17 is then hooked to the post portion 11 below the helical portion 16 of the next section, thus holding the helical portion of one section from sliding longitudinally of the post portion of the next section. In Figure 1 of the drawings, the hook ends 22 will be shown encircling the posts 11 below the helical portion of the adjacent section, thereby preventing the helical portion from sliding downwardly relative to the post portion. This arrangement permits the sections to pivot freely relative to one another, the helical portion of one section pivoting about the axis of the post of the next section.

The various sections 10 are normally sprung out of shape as indicated in Figures 2 and 3. However, when the fence sections are assembled together, the axis of the helical portion 16 extends substantially parallel to the axis of the post portion 11. As a result the posts of the fence sections are all parallel in assembled condition of the fence, but the fence may possess any desired shape in plan, the fence readily curving between sections so that the fence may be circular or rounded in form, as well as straight or angular.

Figure 1 of the drawings shows an end of a series of sections of fence. Where the fence is not of the endless type and must be possessed of two spaced ends, a post 23 approximately similar in length to the post portions 11 of the section 10 is inserted through the helical portion 16 of the last section of the series. Thus the fence is provided with a finished appearance at both ends.

The posts 10 and the end posts such as 23 may be inserted into the ground to the proper depth to support the fence in any desired location. If the fence is made in endless form, or if the fence ends are connected together, the fence may rest upon a hard surface if preferred. However, in order to maintain the fence in proper shape, it is preferred that the posts be inserted into the ground or into other suitable embedding material.

In accordance with the patent statutes, I have described the principles of construction and operation of my fence construction, and while I have endeavored to set forth the best embodiment thereof, I desire to have it understood that obvious changes may be made within the scope of the following claims without departing from the spirit of my invention.

I claim:

1. A fence comprising a series of resilient sections, each section including a post portion, a helical portion, an upper bridging portion having its opposite ends integrally connected to the upper end of the post portion and the upper end of said helical portion, and a lower bridging portion having one end integrally connected to the lower end of said helical portion and its other end terminally equipped with hook means for detachably engaging said post portion, said hook means being normally displaced from said post portion and adapted to retain the helical portion in spaced generally parallel relation to the post portion when said hook means is flexed into engagement with said post portion, said helical portion including a convolution having an axial length appreciably greater than its diameter, whereby said convolution will engage the post portion of an adjacent fence section at a plurality of axially spaced points when said hook means is engaged with the post portion of the fence section of which it is a part.

2. A fence section comprising an elongated body of resilient wire, said body including a generally straight post portion, a top connection member extending generally at right angles to said post portion, a helical portion extending generally parallel to said post portion, said helical portion including a convolution having an axial length greater than its diameter whereby said helical portion is adapted to contact a post portion when passing therethrough at a plurality of axially spaced points, and a second cross connecting member integrally secured to the lower end of said helical portion and extending toward said post portion, said second connection member having a hook end normally spaced from said post portion and designed to resiliently engage said post portion when said hook is flexed into an embracive relation with said post portion.

BERT A. QUINN.

References Cited in the file of this patent

UNITED STATES PATENTS

| Number | Name | Date |
|--------|------|------|
| 899,605 | Miller | Sept. 29, 1908 |
| 1,142,233 | Bryning | June 8, 1915 |